No. 880,483. PATENTED FEB. 25, 1908.
M. DERIHON.
MACHINE FOR TESTING THE WEAR OF METALS.
APPLICATION FILED JUNE 24, 1907.
Fig. 1.
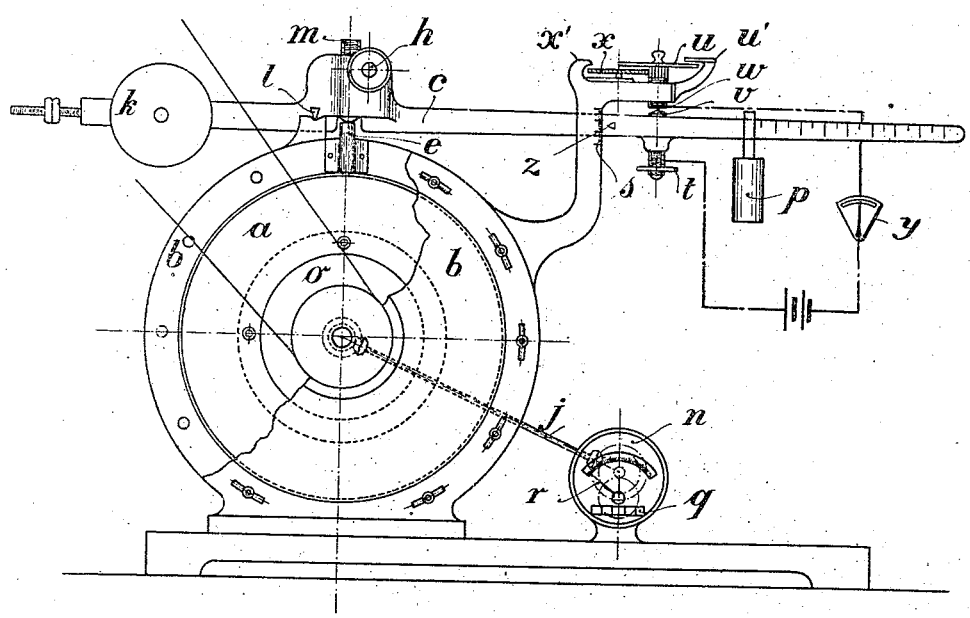
Fig. 2.
Fig. 3.
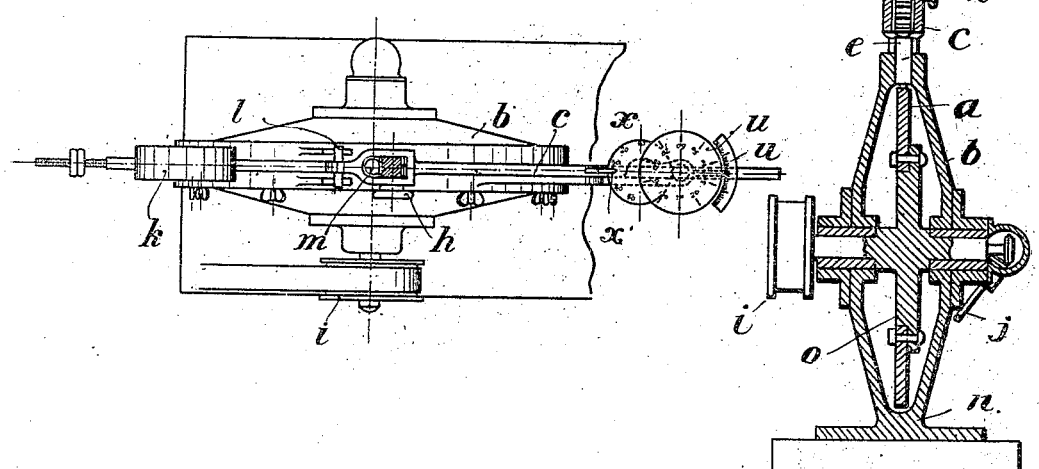
Witnesses
Inventor
Martin Derihon
by Foster Freeman Watson &c
Attys

UNITED STATES PATENT OFFICE.

MARTIN DERIHON, OF LIEGE, BELGIUM.

MACHINE FOR TESTING THE WEAR OF METALS.

No. 880,483.     Specification of Letters Patent.     Patented Feb. 25, 1908.

Original application filed March 9, 1907, Serial No. 361,532. Divided and this application filed June 24, 1907. Serial No. 380,541.

*To all whom it may concern:*

Be it known that I, MARTIN DERIHON, a subject of the King of Belgium, residing at Liege, Belgium, have invented certain new and useful Improvements in Machines for Testing the Wear of Metals, of which the following is a specification.

The invention described in this application, which is a division of my prior application filed March 9, 1907, Serial No. 361,532, relates to improvements in machines for testing metals by wear and will be described in connection with the accompanying drawings, in which, Figure 1 is an elevation, partly broken away, of a machine constructed in accordance with the invention; Fig. 2 is a plan view; Fig. 3 is a vertical sectional view through a portion of the machine.

Referring to the drawing, the machine includes a revoluble disk $a$ mounted upon a suitable shaft journaled in a casing $b$, said shaft being provided outside of the casing with a pulley $i$ by which the disk may be rotated. The body of metal $e$ to be tested is inserted in a suitable passage in the casing $b$ and pressed against the periphery of the disk $a$ by a lever $c$. The latter is fulcrumed upon suitable bearings on the casing $b$ by means of knife edges $l$ and upon the longer arm thereof, which is suitably graduated, is mounted a sliding weight $p$ by adjusting which the degree of pressure exerted on the body $e$ may be varied as desired. A counter weight $k$ is also provided for holding the lever normally in a truly horizontal position.

The lever engages the body $e$ through a micrometer screw $m$ which may be adjusted longitudinally by a regulating screw $h$.
Prior to beginning a test the parts are so adjusted that the screw $m$ is in contact with the body $e$ and the lever $c$ is in a horizontal position. As the lower surface of the body $e$ is worn away by the rotation of the disk $a$, said body will be moved toward the disk and the lever $c$ shifted from its horizontal position.

To determine the extent of such wearing of the piece $e$ and consequent movement of the lever $c$ from its normal position, the latter is provided with a pointer $z$ which coöperates with a scale $s$, shown as formed on the vertical member of a frame arm extending from the casing $b$. It will be understood that normally the pointer $z$ is in alinement with the zero indication on said scale and as the lever moves from such normal position under the influence of the weight $p$, as the body $e$ is worn by the disk $a$, the relative position of the pointer $z$ on the scale will indicate the extent of such movement and the consequent wear of the body tested. A gear on the shaft of the disk $a$ drives a shaft $j$ which is adapted to actuate a counter $n$, the pointer $r$ of which indicates the speed of revolution of the disk $a$ at any instant. Said counter may also be provided with an indicator $q$ for showing the number of revolutions of the disk $a$ during any experiment.

In order that the movement of the lever $c$ may be determined with great accuracy, means supplemental to the scale $s$ are provided. As shown the frame member carrying the scale $s$ is provided with an arm which extends parallel to the lever $c$ when the latter is in its normal position and in said horizontal frame arm is mounted a micrometer screw $w$ which is provided at its upper end with a suitably graduated disk $u$ coöperating with a fixed scale $u'$. The lower end of the screw $w$ is adapted to contact with an adjustable contact $t$ carried by the lever and the indicator consisting of said screw $w$ disk $u$ and scale $u'$ bears a definite relation to the scale $s$. For instance, the graduations of said supplemental indicator may be related to the scale $s$ in the proportion of ten to one so that said supplemental indicator will represent movements of the lever $c$ which are one-tenth as great as those indicated by the scale $s$.

A still more exact determination of the movements of the lever $c$ may be obtained through a graduated disk $x$ gearing with the micrometer screw $w$ and coöperating with a fixed pointer $x'$. The relation of the indicator $x$ to the disk $u$ may correspond to that between the latter disk and the scale $s$. That is, movements of the lever which would correspond to ten divisions of the scale $s$ would correspond respectively to one hundred and one thousand divisions on the disks $u, x$.

It will be understood that at the beginning of a test the contact $t$ is so adjusted that it will bear on the lower end of the pin $w$ when the latter is in such position that both of the disks $u, x$, are in their zero or normal positions. As the lever $c$ moves from its horizontal position it is possible by turning the screw $w$ until it again bears on the contact $t$ to determine with great accuracy the extent of movement of said lever and the consequent wear of the body $e$. In order that the operator may be informed when contact is established between the screws $w$, $t$, they may be electrically connected by a circuit including a volt meter indicator $y$, the needle of which will be deflected the instant that the circuit is closed by contact of said screws.

The manner of using the apparatus will be readily understood. Preferably the casing $b$ is filled with oil so that there will be the proper lubrication between the disk $a$ and body $e$.

Having described my invention what I claim and desire to secure by Letters-Patent is, 1. In a machine of the character described, the combination of a revoluble disk, a lever adapted to constantly press the body to be tested against the disk, a relatively stationary scale, a pointer carried by the lever and coöperating with said scale to indicate the extent of movement of the lever and consequent wear of the body tested, a second scale, and adjustable means coöperating with the second scale to indicate movements of the lever of less extent than those indicated by the first said scale.

2. In a machine of the character described, the combination of a revoluble disk, a lever adapted to press the body to be tested against the disk, a weight adjustable on said lever to vary the pressure exerted thereby, a scale extending transversely of the lever, a pointer carried by the lever and coöperating with said scale to indicate the extent of movement of the lever, and supplemental means coöperating with the lever and having a definite relation to said scale for indicating movements of the lever less than those corresponding to graduations on said scale.

3. In a machine of the character described, the combination of a revoluble disk, a lever adapted to press the body to be tested against the disk, a scale, a pointer moving with the lever and coöperating with said scale to indicate the extent of movement of the lever, a screw movable toward and from the lever, and means controlled by turning said screw for indicating movements of the lever of less extent than those indicated by said scale.

4. In a machine of the character described, the combination of a revoluble disk, a lever adapted to press the body to be tested against the disk, a scale, a pointer moving with the lever and coöperating with said scale to indicate the extent of movement of the lever, a screw movable toward and from the lever, an adjustable contact on the lever in the path of said screw, said contact and screw being adjusted into contact relation at the beginning of a test, and means, controlled by turning said screw to again bear on said contact on the lever, for indicating movements of the lever of less extent than those indicated by said scale.

5. In a machine of the character described, the combination of a revoluble disk, a lever adapted to press the body to be tested against the disk, a scale, a pointer moving with the lever and coöperating with said scale to indicate the extent of movement of the lever, a screw movable toward and from the lever, a second scale, and a graduated disk connected with said screw and coöperating with said second scale when the screw is adjusted to contact with the lever after the latter has moved from its initial position to indicate movements of the lever of less extent than those indicated by the first said scale.

6. In a machine of the character described, the combination of a revoluble disk, a lever adapted to press the body to be tested against the disk, a frame having a member extending parallel to the lever when the latter is in normal position, a scale, a pointer carried by the lever and coöperating with said scale, a micrometer screw mounted in said frame member and movable into contact with the lever, and means controlled by turning said screw for indicating movements of the lever of less extent than those indicated by said scale.

7. In a machine of the character described, the combination of a revoluble disk, a lever adapted to press the body to be tested against the disk, a frame having a member extending parallel to the lever when the latter is in normal position, and means for indicating the extent of movement of the lever and consequent wear of the body tested including a scale mounted on said frame member, and a micrometer screw mounted in said frame member and movable toward and from the lever.

8. In a machine of the character described, the combination of a revoluble disk, a lever adapted to press the body to be tested against the disk, a frame having a member extending parallel to the lever when the latter is in normal position, a scale extending transversely of the lever, a pointer moving with the lever and coöperating with said scale, a micrometer screw mounted in said frame member and movable toward and from the lever, an indicator controlled by turning said screw for indicating movements of the lever of less extent than those indicated by said scale, and a graduated disk geared to said screw and coöperating with a pointer on said frame for indicating movements of the lever of less extent than those indicated by said scale or indicator.

In testimony whereof I affix my signature in presence of two witnesses.

MARTIN DERIHON.

Witnesses:
ACHILLE LATINNE,
HENRI WILKIN.